United States Patent [19]
Netravali et al.

[11] Patent Number: 5,084,877
[45] Date of Patent: Jan. 28, 1992

[54] HIGH SPEED TRANSPORT PROTOCOL

[75] Inventors: Arun N. Netravali, Westfield, N.J.; Krishan K. Sabnani, Berkeley Heights, N.J.

[73] Assignee: AT&T Bell Laboratories, Murray Hill, N.J.

[21] Appl. No.: 348,449

[22] Filed: May 5, 1989

[51] Int. Cl.$^5$ .......................... G08C 25/02; H04L 1/18
[52] U.S. Cl. ...................... 371/32; 370/94.1; 370/60
[58] Field of Search .............. 371/32, 33; 370/60, 370/94.1

[56] References Cited

U.S. PATENT DOCUMENTS

| | | | |
|---|---|---|---|
| 3,754,211 | 8/1973 | Rocher et al. | 371/33 |
| 3,879,577 | 4/1975 | Progler | 371/32 |
| 3,979,719 | 9/1976 | Tooley et al. | 371/32 |
| 4,422,171 | 12/1983 | Wortley et al. | 371/32 |
| 4,430,702 | 2/1984 | Schiebe et al. | 364/200 |
| 4,439,859 | 3/1984 | Donnan | 371/32 |
| 4,617,657 | 10/1986 | Drynan et al. | 370/94.1 |
| 4,730,348 | 3/1988 | MacCrisken | 371/33 |
| 4,803,685 | 2/1989 | Oget | 371/36 |

Primary Examiner—Jerry Smith
Assistant Examiner—Ly V. Hua
Attorney, Agent, or Firm—Henry T. Brendzel

[57] ABSTRACT

A communications protocol that communicates absolute state information, as contrasted to incremental information, on a regular basis to achieve high throughput by reducing the need for retransmissions. The protocol exchanges control messages that contain all of the relevant state information between the receiver and the transmitter on a frequent, routine and periodic basis, independent of any significant event that may have taken place in the receiver or the transmitter. The periodic rate of state exchange depends on the activity on the logical channel. The data communication from the transmitter to the receiver is in blocks of packets, with each block carrying a sequence number. Selective retransmission procedures are initiated by the transmitter whenever a control packet from the receiver identifies a failed reception. When a packet in a block fails to be received properly, the entire block, but only that block, is retransmitted.

13 Claims, 3 Drawing Sheets

FIG. 1
| LCI | K | $LW_r$ | LOB | BUFFER_AVAILABLE | ERROR CHECK |
|---|---|---|---|---|---|
| 16 BITS | 8 BITS | 16 BITS | L BITS | 16 BITS | 16 BITS |
FIG. 2
| LCI | K | $UW_t$ | NO. OF PACKETS QUEUED FOR TRANSMISSION | ERROR CHECK |
|---|---|---|---|---|
| 16 BITS | 8 BITS | 16 BITS | 16 BITS | 16 BITS |
FIG. 3
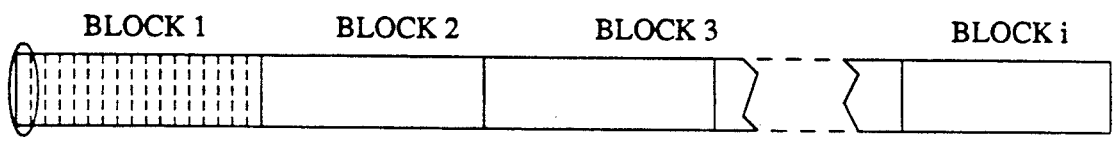
FIG. 3a
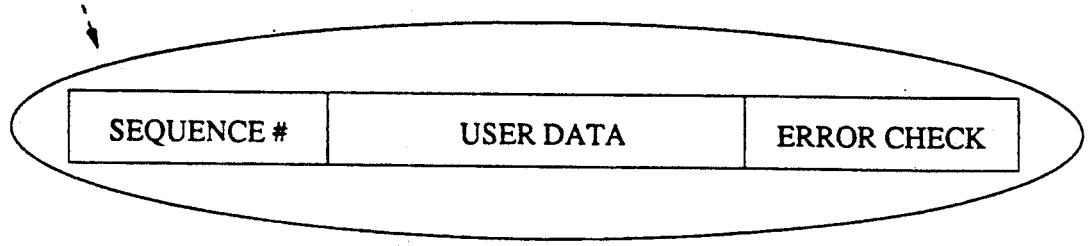

HIGH SPEED TRANSPORT PROTOCOL

BACKGROUND OF THE INVENTION

This relates to transmission protocols and more particularly to transmission protocols in a packet transmission environment.

Advances in data transmission and switching over the last decade are promising deployment of communication systems with raw bandwidth and switching speeds that are an order of magnitude higher than the current systems. Optical fibers, for example, allow transmission of tens of gigabits/sec over several kilometers without repeaters. Switch fabrics that can switch bit-streams of more than hundreds of megabits/sec have already been prototyped. One such system has been described, for example, by A. Huang and S. Knauer in "Starlite: a Wideband Digital Switch," *Proceedings of Globecom 84*, December 1984, pp 125-127. However, the fruits of these efforts have not yet been realized in internetworking of diverse high speed networks, and have not yet been realized in delivery of high end-to-end bandwidth to applications within an operating system. Ideally, any single user connected to a packet network should be able to transmit at the peak bandwidth of the channel, once access is obtained. In practice, however, the obtainable end-to-end throughput is only a small fraction of the transmission bandwidth, particularly at high speeds. This throughput limitation comes from a variety of factors, including protocol processing in the networks layers, buffer congestion, and flow control mechanisms, as well as from various interfaces that transfer data from the network to a process in the host.

Reliable communication can be achieved with very little protocol processing if the network is perfect. It is clear that the limitations due to protocol processing come about because the protocol has to overcome network deficiencies such as bit errors large and varying packet delays in the network, packet loss due to congestion, out-of-order delivery of packets and overflow of buffers at various nodes in the network. Recently, there has been considerable interest in transport protocols for high speed networks. Broadly, higher speed can be achieved by a combination of three means. First, one can assume that the network has fewer deficiencies and therefore the protocol has to correct for fewer network problems. An example of this is the Packet Stream Protocol (PSP) which assumes a virtual circuit network and, therefore, packets are never received out of order. Second, higher speeds can be obtained by implementing some of the protocol processing in hardware. Third, one can invent new protocols that are better suited for high speed networks. The latter is the primary thrust of the instant invention.

To illustrate where the bottlenecks in present day transport protocols come from, it is instructive to consider a protocol such as the one based on "Go back N method" of error and flow control over a datagram network. This protocol is described, for example, by D. Comer in *Internetworking with TCP/IP*, Prentice Hall, 1988. Such a protocol may be in use, for example, over a network which has a large bandwidth—such as 1 Gbit/sec—and large latency—such as 60 msec (which is approximately the round trip delay for a terrestrial network between New York and San Francisco). In such a network, the states of the two communicating ends (i.e. Transmitter and Receiver) are usually out of synchronization due to the round trip propagation delay. Therefore, any change in the state of the transmitter or the receiver can be made known to the other only after a certain amount of delay. For a 1 Gbit/sec network, there can be 30 Mbits in transit from the transmitter to the receiver. Therefore, in the Go back N method of error control, if there is either a transmission error, a packet loss, long delay in delivery of a packet, or delivery of a packet out of sequence, 60 Mbits may have to be retransmitted. Similarly, if the buffer at the receiver overflows, the overflowed packets can be recovered only after 60 Mbits are retransmitted. This causes significant loss of throughput due to retransmissions. In addition, if some of the control messages from the receiver to the transmitter are received in error, elaborate error recovery mechanisms are necessary because the receiver has no way of knowing whether the transmitter has received the message correctly. Such difficulties are usually handled by timers which go off after a certain amount of waiting, determined by the round trip propagation delay. In most datagram networks this delay varies widely and is difficult to estimate. Thus, while such protocols were deemed reasonable two decades ago, when only low bandwidth was available at a considerable expense and the latency of the network was not large (due to small geographical size of most of the networks), their suitability for the future is questionable. This is due to loss of throughput and the large amount of protocol processing that results from using economized control messages that contain only changes in certain states. Moreover, the large number of control messages, and states, and the dependence on round trip propagation delay in some of the protocol processing make it difficult to parallelize the protocol processing.

SUMMARY OF THE INVENTION

Our protocol overcomes many of these difficulties without restricting the network, by using a small portion of the bandwidth for periodic exchange of states.

The new protocol exchanges control messages that contain all of the relevant state information between the transmitter and the receiver on a frequent, routine and periodic basis, independent of any significant event that may have taken place in the receiver or the transmitter. The periodic rate of state exchange depends on the activity on the logical channel. This is in sharp contrast to all the current protocols in which only changes in the state are exchanged whenever significant events take place (such as detected loss of a packet, overflow of a buffer). The instant approach greatly simplifies the protocol processing by removing the elaborate error recovery procedures and makes it easy to parallelize the protocol processing, which further improves the performance. In addition, in order to handle datagrams without losing throughput in high speed and high latency networks, we employ selective retransmission. Selective retransmission procedures typically require large tables and complex processing. To keep processing within reasonable limits, we use the concept of blocking. A group of packets (typically, 16) is called a block. The receiver acknowledges blocks, not individual packets. If one packet in a block is delivered incorrectly, the entire block is retransmitted. This enables us to make throughput almost independent of the variations in round trip delay, while keeping the processing within reasonable limits.

BRIEF DESCRIPTION OF THE DRAWING

FIG. 1 describes the receiver's control packet;

FIG. 2 describes the transmitter's control packet;

FIG. 3 and FIG. 3a describe the transmitter's data packet arrangement;

DETAILED DESCRIPTION

Overview

Figure 4:
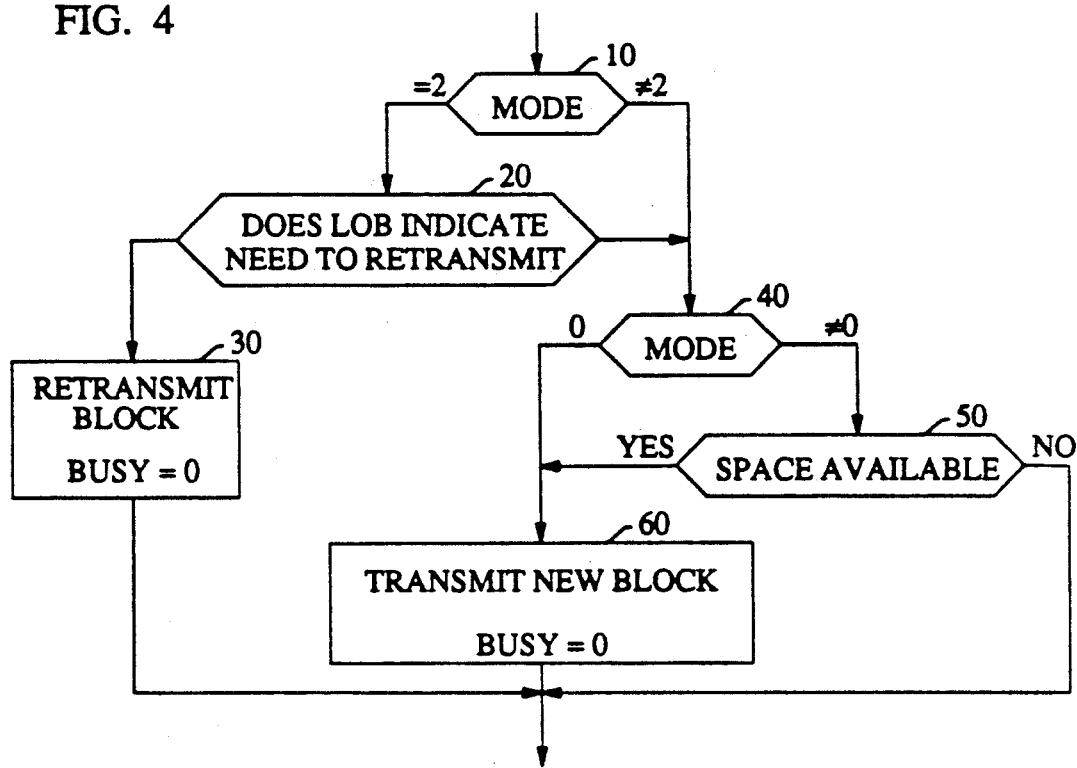
FIG. 4 presents the flow chart for transmitter process $T_1$.

As indicated above, our protocol is directed to packet oriented systems. In such systems, there is a transmitter that transmits packets to a designated receiver, a receiver that receives the packets destined to it, and a communications channel. The communications channel may have dedicated connections in a network or an interconnection of networks.

In accordance with the principles of our invention, the transmitter sends data packets to the receiver in blocks, or groups, of packets. At least as often as necessary, the transmitter also sends a control packet to the receiver. The control packet contains all of the information about the transmitter that is relevant to the receiver. For example, the transmitter sends to the receiver a measure of the number of packets that are in the transmission queue. In one embodiment of our invention, the transmitter sends its control packets periodically. The repetition rate is dependent of the level of activity of the transmitter.

Also in accordance with the principles of our invention, the receiver periodically sends a control, or a state, packet to the transmitter. The receiver's control packet provides the transmitter with all of the information about the state of the receiver that is relevant to the transmitter.

The transmitter receives the receiver's control packet and analyzes the data. If it finds that a particular block had been received with an error (or not received at all), and if a certain wait indicator permits, then it retransmits the block. At that point the wait indicator is set to prevent further retransmissions until the retransmitted block has sufficient time to be received and sufficient time to acknowledge the reception. In other words, the wait indicator is set to at least cover the round trip delay (RTD).

The information about packets that have been received correctly and incorrectly is kept in the transmitter within a table (LUP). That table is periodically updated so that only the proper blocks get retransmitted, and so that continuous block sequences that have been send and acknowledged as having been received properly can be deleted from the table, to keep the table relatively current.

By virtue of our protocol, the various operations that need to be performed in the transmitter and the receiver have all of the necessary information in the transmitter and the receiver, respectively. Therefore, those operations can be performed without interaction between the transmitter and the receiver. Furthermore, even the operations within the transmitter and the receiver are independent of each other and, accordingly, these operations can be performed in parallel.

Protocol Details

Packets that carry data are identified by a sequence number and are numbered modulo $2^{32}$. A group of packets (typically a power of 2, such as 16) is called a block. The sequence number of a block that contains 16 packets is the number resulting from dropping the lowest 4 bits from the sequence number of the first packet in the block.

The protocol provides for error recovery, sequenced delivery, flow control, and multiplexing/demultiplexing. It has three modes of operation. Mode 0 has no error and no flow control. It is suited for virtual circuit networks in which quick interaction (e.g. terminals connected to a host) is desired. Mode 1 has no error control but does have flow control. Many real time applications, such as packetized voice or real-time monitoring of remote sensor data, can be supported by this. Mode 2 has both error and flow control. It is useful for large file transfers.

Multiplexing/demultiplexing is done in all three modes. Traffic from/to many users is multiplexed/(demultiplexed) by the protocol. A logical connection is established between two users once the connection establishment phase is completed successfully. The local connection is maintained by a logical connection identifier field (LCI) in each packet that flows from the transmitter to the receiver (and vice versa).

The description that follows assumes that an initial connection phase of the receiver to the transmitter is accomplished via the standard three-way "handshake" in which the following parameters are negotiated: mode of communication, bandwidth, packet size, block size, and buffer required at the receiver. This "handshake" standard is described by A. S. Tannenbaum in *Computer Networks*, Second Edition, 1988. In addition, it is expected that an estimate of round trip delay is available during the connection set-up.

Each logical connection has its own prenegotiated buffer at the receiver. This buffer is arranged according to the packet sequence numbers and random update/access to any sequence numbered location within its range is possible. This buffer can typically store blocks that the transmitter would send during one roundtrip delay (L seconds). Its size should be slightly larger than (RTD × negotiated bandwidth) bits, where RTD is the round trip delay. Thus, as the receiver accepts valid packets, it stores them according to their sequence in the buffer memory and it keeps a record of the largest sequence number ($LW_r$) of a packet that has been received properly and which is characterized by no packets of a lower sequence number that have not been received properly. Described differently, the receiver's buffer keeps packets in ascending sequence number order. First are the sequence numbers of blocks that have been received properly but have not yet been read by the host that is connected to the receiver's protocol interface. Associated with these sequence numbers, the buffer contains, of course, the received blocks of packets. Next comes a sequence number that corresponds to a block that has not been received, or has been received with an error (i.e. a packet or packets in the block are in error). That sequence number is $LW_r + 1$. Thereafter come the sequence numbers of other blocks that have been received properly or improperly. The total number of packets kept is not more than the receiver's buffer.

The host that is connected to the receiver's interface protocol also uses the $LW_r$ number. Specifically, the host is restricted to read from the buffer only up to $LW_r$. In the case where there are no missing blocks, $LW_r$ is set to the sequence number of the last block in the buffer.

FIG. 1 depicts the control, or state, packet that flows from the receiver to the transmitter. In a sense, this packet is the primary transmission control packet because it serves the acknowledgement function. The LCI field in FIG. 1 identifies the Logical Connection that ties a particular transmitter to a specific receiver. The unique identifier in LCI is assigned to the logical connection during the connection establishment phase. The second field in FIG. 1 defines k, which is the interval between two control packet transmissions expressed in units of $T_{IN}$. $T_{IN}$ is the minimum time between two state transmissions. It is a predefined parameter. The next field in FIG. 1, LOB, is the List of Outstanding Blocks field. It corresponds to the received blocks about which the control packet reports to the transmitter. More specifically, the LOB field is encoded as a bit map, with each bit representing the reception status of a corresponding block of packets. The first bit indicates whether the block identified by $LW_r$ was received correctly (1), or incorrectly (0). The second bit indicates whether the block having the sequence number $LW_r+1$ was received correctly (1), or incorrectly (0), etc. As indicated above, a block is said to have been received incorrectly when at least one packet in the block was not correctly received.

One way to look at the LOB field is that the number of bits in the LOB field is related to the level of redundancy that is desired. In one embodiment, we employ an LOB field of L-bits, where L is the number of blocks in transit. When the interval between successive receiver control blocks is one tenth the round-trip delay, use of L-bits in the LOB block represents a ten-fold redundancy. Higher or lower redundancies are, of course, possible. Of course, the receiver's buffer size (in terms of blocks of packets) must be greater than the number of bits in LOB. It also should be pointed out that when there are no missing blocks in the receiver and $LW_r$ is equal to largest block sequence, then there is only one active bit in the LOB field.

The next field in FIG. 1 is the buffer-available field. Through this field, the receiver informs the transmitter of the amount of buffer that is available at the receiver. When the buffer-available figure is below a predetermined level, the transmitter has the option of ceasing transmission or, at least, lowering the rate of transmission.

The last field in FIG. 1 is the error-check field. This field contains an error checking and correcting code that permits the transmitter to determine that the receiver's control packet was received correctly.

FIG. 2 describes the control packet sent by the transmitter. The first field in FIG. 2 is the LCI field. This field may differ from the LCI field of FIG. 1 in that this LCI field must include a bit that identifies whether the transmitted packet is a data packet or a control packet. Of course, this additional bit can be included in the FIG. 1 LCI field to make the two fields identical in format.

The second field in FIG. 2 is the k field, and it is identical to the corresponding field in FIG. 1.

The third field in FIG. 2 is the $UW_t$ field. It carries the block sequence number of the last data block transmitted immediately prior to the transmission of the transmitter's control block. The penultimate field in FIG. 2 identifies the number of packets queued for transmission. This number may be large, indicating that the transmitter is heavily burdened with data, or it may be very small—perhaps less than the number of packets to fill a complete block. In both instances, this number is used by the receiver to help it respond properly to the transmitter's state. The number of blocks queued for transmission can also help the receiver to decide whether to accept connection to another transmitter.

The last field in FIG. 2, as in FIG. 1, is the error check field which permits the receiver to verify that the transmitter's control packet was received accurately.

FIG. 3 and FIG. 3a depict the structure of the data transmission by showing a sequence of transmitted blocks and by further showing the first packet in the first block. That packet, as all other packets, contains a sequence number, the user data, and an error check field. The sequence number is the aforementioned modulo $2^{32}$ number. The error check field in FIG. 3a is a 16 bit field. Advantageously, it can contain a standard CRC (cyclic redundancy code). The error check information may come from the lower layer if such error detection is done at that level.

As indicated above, the field k specifies the number of control packet transmissions within one round trip delay. The value of k is negotiated at the connection establishment time but can vary with the activity on the logical connection. That is, when a logical connection is set up, k is set to a constant such as 32 (typically a power of 2), when the logical connection becomes inactive, the frequency of data transmission is reduced by a factor of 2. Further reductions follow if the transmitter remains inactive and, in this manner a number of consecutive frequency reductions can be made; but not below some predetermined frequency. For example, a reduction factor of 8 may be the largest acceptable frequency reduction factor. When the logical connection becomes active again, the frequency jumps back to the original level, i.e. the value of k is reduced to the original constant.

As indicated earlier, our protocol is well partitioned from a processing standpoint at both the transmitter and the receiver. The transmitter requires three processes ($T_1$, $T_2$, and $T_3$) and the receiver requires four processes ($R_1$, $R_2$, $R_3$, and $R_4$). There is very little interaction between these processes.

Transmitter Processes

Transmitter process $T_1$ determines whether there is any block that needs retransmission. For that determination, the transmitter maintains an LUP table. An entry in the LUP contains the sequence number of an outstanding block (seq #), its retransmission count (count), and a bit indicating whether it has been successfully acknowledged (ack). When a block is transmitted, the retransmission count for that block is set to (C+2), where C is equal to $RTD/T_{IN}$. Thereafter, it is decremented by k every time the transmitter receives the state packet from the receiver. The constant 2 is added to C to insure that the time-out period is slightly larger than the round-trip delay. Since the round trip delay can vary, one would want to make sure that a block does not have to be retransmitted simply because the acknowledgement arrives a little late. A block is scheduled for retransmission only if it is not yet acknowledged and its retransmission count is 0.

Process $T_1$ examines the LUP table and, based on its contents, it picks either a new block or a previously transmitted block and schedules it for transmission. After transmitting the block, the process makes appropriate updates to the LUP table; to wit it sets the count to $C+2$.

FIG. 4 presents a flow diagram of process $T_1$. Step 10 determines the mode of operation. When the mode is 2, indicating that error control is in effect, control passes to step 20 which determines whether the LOB field in the received control packet reveals a need to retransmit a block. If it does, control passes to step 30 which retransmits the block and sets a "busy" indicator to 0. This indicator is used in process $T_3$ to control the frequency of control packet transmissions. When the LOB field does not reveal a need to retransmit a block, control passes to step 40. Control also passes to step 40 when the indication at step 10 is that mode is not equal to 2. At step 40, the mode is again queried. When it is not 0, control passes to step 50 which determines whether space is available at the receiver's buffer. If space is available, or when step 40 determines that the mode is equal to 0, control passes to step 60 where a new block is transmitted and the "busy" indicator is set to 0.

Figure 5:
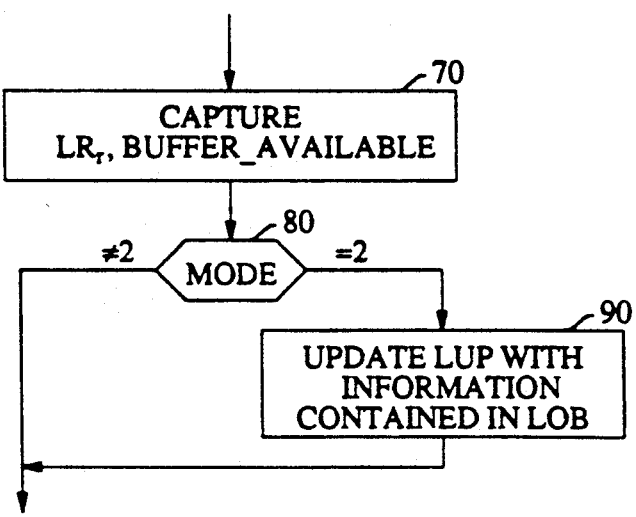
FIG. 5 presents the flow chart for transmitter process $T_2$.

Process $T_2$, which updates the LUP table, is presented in FIG. 5. Step 70 in FIG. 5 captures the sequence number, $LW_r$, and the buffer_available information from the control block sent by the receiver. Step 80 determines the mode of operation. When the mode of operation is 2, indicating that error control is in effect, control passes to step 90 which updates the LUP table with the information contained in the LOB field.

Process $T_3$ transmits the state of the transmitter at regular intervals, as described above. The output of process $T_3$ is multiplexed with the output of process $T_1$. In case of conflict, state packets get priority over data packets.

Figure 6:
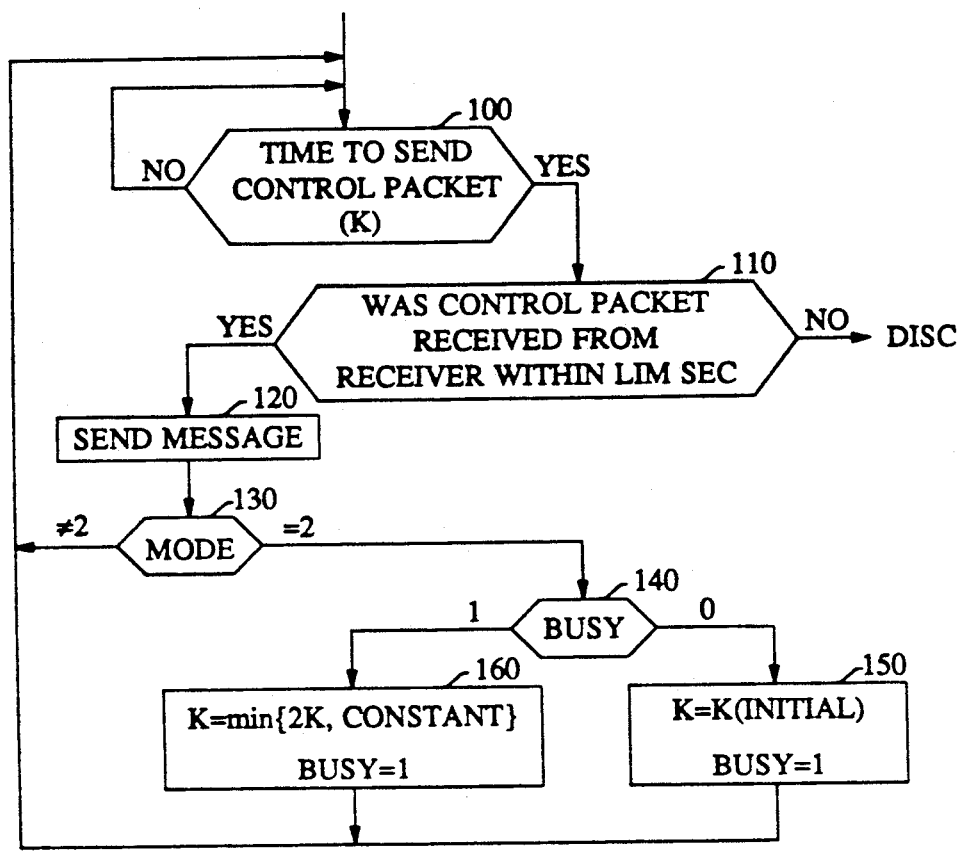
FIG. 6 presents the flow chart for transmitter process $T_3$.

FIG. 6 describes the transmitter process $T_3$. The main loop in the process $T_3$ is depicted by step 100, which basically is a timer that determines the expiration of k intervals. When the step determines that it is time to send a control packet, control passes to step 110. Step 110 determines whether a control packet was received from the receiver within a predetermined time interval (LIM seconds). Should it occur that a control packet had not been received from the receiver within the LIM seconds, the system moves to state DISC which disconnects operations. Otherwise, the transmitter's control packet is sent by step 120 and control passes to step 130. Step 130 determines the mode of operation. When the mode of operation is 2, step 140 ascertains the status of the "busy" variable set by process $T_1$. When busy equals 0, step 150 sets k to its original value and sets "busy" to 1. When "busy" equals 1, step 160 sets k to the minimum of 2k or a constant (such as 8 times the original value of k) and also sets "busy" to 1. Control returns thereafter to step 100 to determine the next time a control packet is to be sent in accordance with the new value of k.

Receiver Processes

It is assumed that the data packets received from the network are first checked for errors by the link layer (or a front-end of the transport layer) and if there are errors in a packet, it is simply dropped; otherwise it is delivered to process $R_1$. A variable "busy" is set in the receiver process $R_1$ to 0 when a packet arrives. This variable is used in a similar manner as the variable "busy" in the transmitter.

Figure 7:
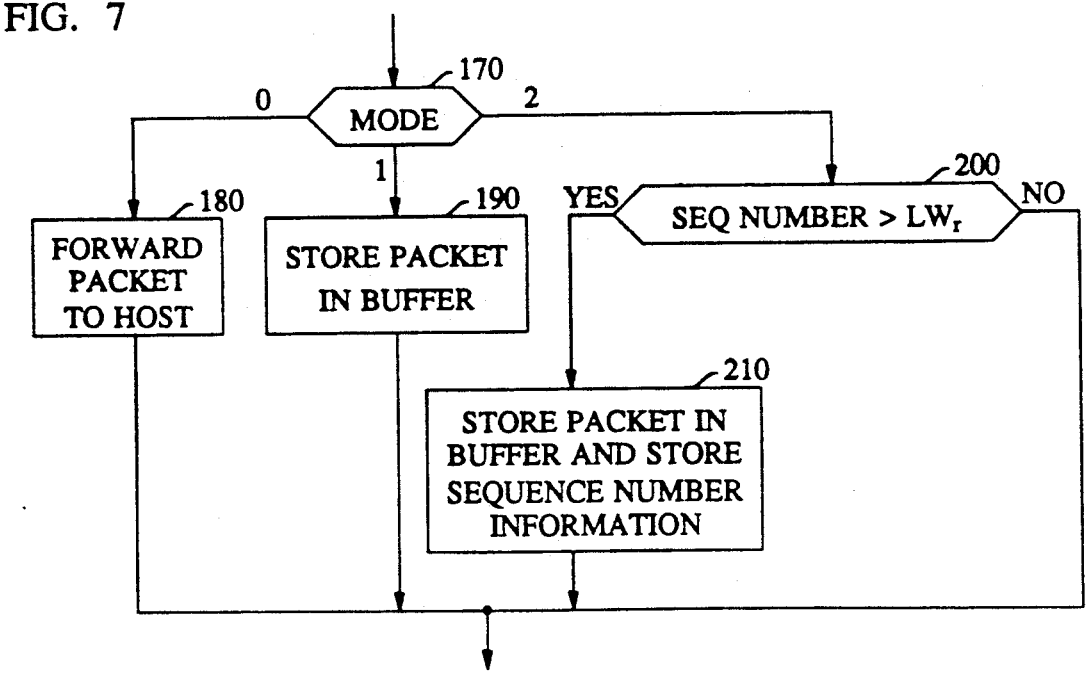
FIG. 7 presents the flow chart for receiver process $R_1$.

FIG. 7 illustrates the receiver process $R_1$. Step 170 directs operations by determining the mode. When mode is 0, the received packet is immediately forwarded to the host by step 180. When the mode is 1, packet is stored in the receiver's buffer by step 190. When the mode is 2, control passes to step 200. Step 200 determines whether the sequence number of the received packet is not greater than $LW_r$. In such a case, the packet is one that had been received accurately before but was retransmitted anyway. This packet is ignored. When the sequence number is greater than $LW_r$, control passes to 210 where the packet is stored in the receiver's buffer and, as necessary, information is stored concerning the block of packets to permit updating of $LW_r$.

Process $R_2$ updates the $LW_r$ variable and runs a timer on the interval between state transmissions by the transmitter. When it is detected that the transmitter has not sent a control packet within a predetermined time interval, the system enters the DISC state and ceases operations.

Process $R_3$ develops the control packet that is sent by the receiver to the transmitter. It basically follows the flow chart of process $T_3$ (FIG. 6).

Process $R_4$ delivers fully acknowledged and sequenced packets to the receiver host on demand from the host. It should be noted that while the unit of data transmission over the network is a block containing many packets (e.g. 16), the delivery to the receiver host is in terms of packets.

We claim:

1. A method for communicating packets of information from a transmitter to a receiver comprising the steps of:
   the transmitter sending packets of data, in blocks of a preselected number of packets, to the receiver; and
   the receiver sending a receiver control packet to the transmitter, at regular time intervals, with the receiver control packet containing all information about the receiver that is relevant to the transmitter.

2. The method of claim 1 further comprising:
   the transmitter sending a transmitter control packet to the receiver, as necessitated by said blocks of packets sent to the receiver, with said transmitter control packet containing all information about the transmitter that is relevant to the receiver.

3. The method of claim 2 wherein said information about the transmitter is existing state information of the transmitter.

4. The method of claim 1 wherein said receiver control packet contains a bit map field that includes a preselected number of bits, where each bit corresponds to the state of reception by said receiver of a block of packets sent by said transmitter.

5. The method of claim 4 where the repetition rate of the receiver control packets is related to the round trip delay incurred when information is sent by the transmitter and is returned by the receiver.

6. The method of claim 5 where said repetition rate is less than 20 percent of the round trip delay.

7. The method of claim 4 where the number of bits in the bit map is greater than the number of blocks received between repetitions of the receiver control packet.

8. The method of claim 1 where the transmitter, in response to said receiver control packet indicating a reception failure of a particular block of packets, retransmits said particular block of packets.

9. The method of claim 8 where the transmitter initiates a wait process once a retransmission of said particular block of packets occurs, that prevents further retransmission of said particular packet for a predetermined period of time.

10. The method of claim 1 where said step of the transmitter sending packets of data in blocks is controlled by information contained in the receiver control packet received by the transmitter.

11. The method of claim 1 wherein said information contained in said receiver control packet is existing state information of said receiver.

12. The method of claim 1 wherein said step of the transmitter sending packets of data in blocks includes a step of selecting a new block of packets for transmission or a previously transmitted block of packets for transmission, with said selecting being controlled by receiver's state information that is present in said transmitter at the time of said selecting, with said receiver's state information being derived from a receiver control packet received by said transmitter.

13. The method of claim 1 further comprising:
the transmitter periodically sending a transmitter control packet to the receiver, with said transmitter control packet containing all information about the transmitter that is relevant to the receiver.

* * * * *